United States Patent [19]
Urazoe et al.

[11] Patent Number: 6,058,501
[45] Date of Patent: May 2, 2000

[54] ERROR DETECTING DEVICE FOR VITERBI DECODER

[75] Inventors: Koichi Urazoe; Toshimitsu Nakahara, both of Tokyo, Japan

[73] Assignee: Mitsubishi Denki Kabushiki Kaisha, Tokyo, Japan

[21] Appl. No.: 08/998,838

[22] Filed: Dec. 29, 1997

[30] Foreign Application Priority Data

Aug. 13, 1997 [JP] Japan ................................. 9-218785

[51] Int. Cl.⁷ ......................... H03M 13/00; H03M 13/12
[52] U.S. Cl. ......................... 714/795; 714/758; 714/788
[58] Field of Search .................................. 714/758, 786, 714/795, 788

[56] References Cited

U.S. PATENT DOCUMENTS

| | | | |
|---|---|---|---|
| 5,422,894 | 6/1995 | Abe et al. | 371/37.4 |
| 5,509,020 | 4/1996 | Iwakiri et al. | 371/43 |
| 5,737,365 | 4/1998 | Gilbert et al. | 375/224 |
| 5,838,697 | 11/1998 | Abe | 371/43.8 |
| 5,878,098 | 3/1999 | Wang et al. | 375/377 |

FOREIGN PATENT DOCUMENTS 6-12095  1/1994  Japan.

Primary Examiner—Stephen M. Baker
Attorney, Agent, or Firm—Rothwell, Figg, Ernst & Kurz

[57] ABSTRACT

An error detecting device of received digital data solves a problem for detecting errors in a conventional device in that error detection following the Viterbi decoding performed on most important bits cannot detect errors even if they include a considerable amount of errors, and that odd sounds result from decoding of voice data, for example. The present error detecting device includes a Viterbi decoder for carrying out the Viterbi decoding of the received digital data, an error number decision portion for comparing a threshold value with the number of errors of the path metric obtained by the Viterbi decoding, and a voice decoder for decoding the received digital data, on which the error number decision portion decides that the number of errors is below the threshold value.

15 Claims, 5 Drawing Sheets

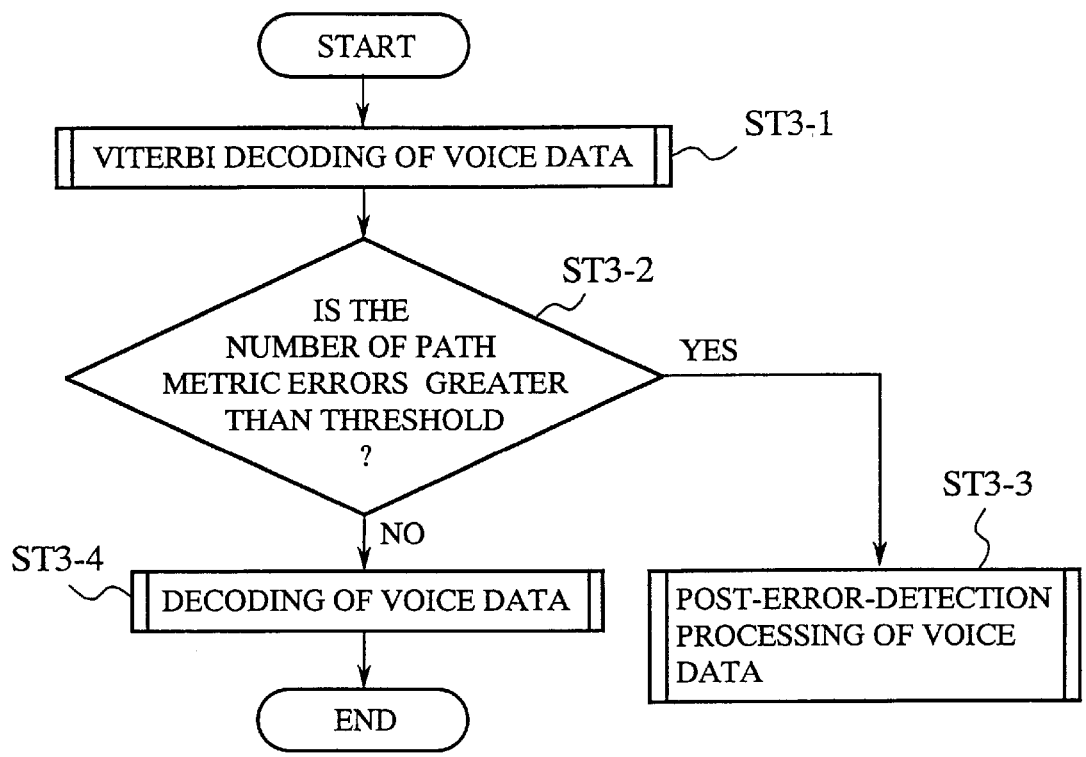
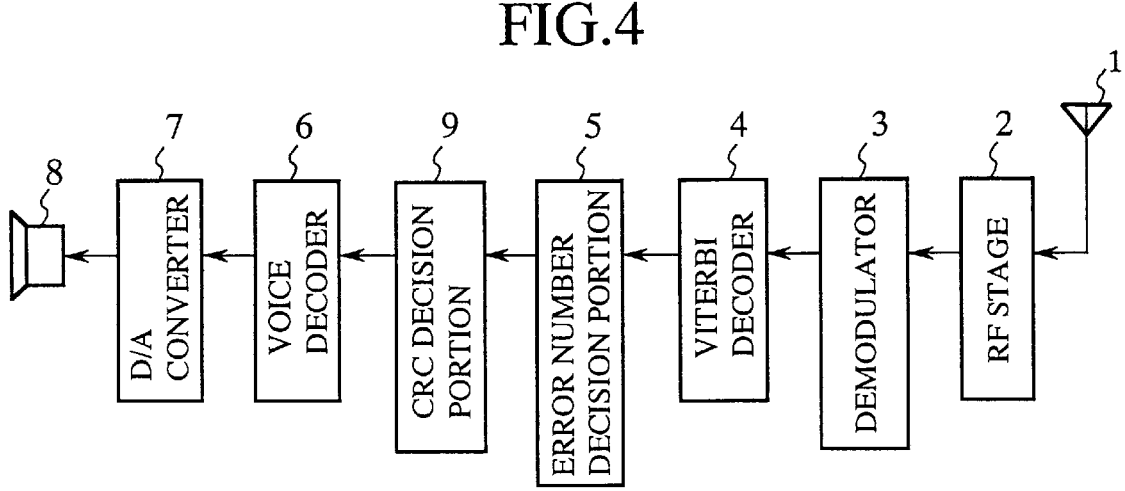

FIG.6

| TOTAL NUMBER OF BITS | NUMBER OF ERRORS OF INPUT DATA | NUMBER OF ERRORS OF PATH METRIC |
|---|---|---|
| 378 | 0 | 0 |
| 378 | 10 | 10 |
| 378 | 20 | 20 |
| 378 | 30 | 31 |

FIG.7

| TOTAL NUMBER OF BITS | NUMBER OF ERRORS OF INPUT DATA | ERROR RATE [%] | NUMBER OF ERRORS OF OUTPUT DATA |
|---|---|---|---|
| 378 | 0 | 0 | 0 |
| 378 | 10 | 2.6 | 0 |
| 378 | 20 | 5.3 | 0 |
| 378 | 30 | 8.0 | 0 |
| 378 | 40 | 10.5 | 0 |
| 378 | 50 | 13.2 | 5 |
| 378 | 60 | 15.8 | 23 |
| 378 | 70 | 18.5 | 72 |

ERROR DETECTING DEVICE FOR VITERBI DECODER

BACKGROUND OF THE INVENTION

1. Field of the Invention

The present invention relates to an error detecting device for detecting errors in received digital data such as voice data, image data, character data or control data handled on a frame by frame basis.

2. Description of Related Art

FIG. 8 is a block diagram showing a configuration of a receiver of a conventional digital portable telephone with an error detecting device of received digital data arranged in frames. In FIG. 8, the reference numeral 101 designates an antenna, 102 designates an RF stage for accepting a received signal through the antenna 101, 103 designates a demodulator, 104 designates a Viterbi decoder, 105 designates a CRC (Cyclic Redundancy Check) decision portion as an error detector, 106 designates a voice decoder, 107 designates a D/A (Digital/Analog) converter, and 108 designates a speaker, which are connected in this order.

Next, the operation of the conventional device will be described with reference to the flowchart of FIG. 9.

Received digital data obtained through the antenna 101, RF stage 102 and demodulator 103 is fed to the Viterbi decoder 104 which carries out error correcting of a voice frame or the like at step ST7-1. Subsequently, the CRC decision portion 105 carries out at step ST7-2 error detection of only most important bits which will be described later. If a decision is made that the received digital data is correct, the voice decoder 106 performs decoding at step ST7-3, and operates the speaker 108 through the D/A converter 107. In contrast, if a decision is made that the received digital data is incorrect, the voice decoder 106 carries out post-error-detecting processing such as mute processing of the voice data at step ST7-4, in which case the D/A converter 107 does not operate the speaker 108.

With such a configuration, the conventional error detecting device of the received digital data performs error detection of only the most important bits after the Viterbi decoding. It sometimes, however, misses detecting a considerable number of errors occurring in the most important bits, resulting in odd sounds produced from the speaker 108 through decoding of the voice data. For example, with regard to the full rate voice frame of the GSM (Global System for Mobile Communications) system, the CRC portion misses many errors occurring in the most important bits because it performs the error detection on the basis of parity bits consisting of only three bits, and hence its error detecting probability is rather low.

The full rate voice frame in the GSM is 20 ms in length, and consists of 260 information bits which are divided into important 182 class-1 bits which undergo error correction, and 78 class-2 bits which do not undergo the error correction. The 182 class-1 bits are further divided into the most important 50 class-1$a$ bits and 132 class-1$b$ bits, and only the most important 50 class-1$a$ bits are subjected to the error detection, that is, the CRC decision.

Thus, the CRC decision portion 105 passes the information bits through a divider to make a decision that no error has occurred if the remainders in the transmitter and receiver match each other, or that some error has occurred if they do not match, in which case the mute processing is carried out. Sometimes, however, because of an error of the parity bits themselves during the transmission, the CRC computed by the receiver can match the CRC generated by the transmitter, even if they must be actually different from each other. In this case, the odd sounds result from the decoding of the voice data.

The probability of such erroneous detection depends on the number of bits of the parity bits of the CRC decision portion 105. For example, when the parity bits consists of three bits, the probability of making a wrong decision becomes $\frac{1}{8}=12.5\%$ in the worst case.

SUMMARY OF THE INVENTION

The present invention is implemented to solve the foregoing problem. It is therefore an object of the present invention to provide an error detecting device for the received digital data which can detect errors in the received digital data at high accuracy.

According to a first aspect of the present invention, there is provided an error detecting device of received digital data comprising: a Viterbi decoder for carrying out Viterbi decoding of the received digital data frame by frame; an error number decision portion for comparing a number of errors of a path metric of the Viterbi decoding with a predetermined threshold value; and a decoder for decoding the received digital data, on which the error number decision portion makes a decision that the number of errors of the path metric is equal to or less than the threshold value.

According to a second aspect of the present invention, there is provided an error detecting device of received digital data comprising: a Viterbi decoder for carrying out Viterbi decoding of the received digital data frame by frame; an error number decision portion for comparing a number of errors of a path metric of the Viterbi decoding with a predetermined threshold value; an error detector for detecting an error of at least part of the received digital data, on which the error number decision portion makes a decision that the number of errors of the path metric is equal to or less than the threshold value; and a decoder for decoding the received digital data, on which the error detector makes a decision that a number of errors is equal to or less than a predetermined value.

Here, the received digital data may be one of voice data, image data, character data and control data.

The error detector may consist of a CRC (cyclic redundancy check) detector.

The threshold value may be preset at a value associated with a number of bits subjected to error correction in each frame.

The received digital data may consist of a combination of at least two types of data selected from voice data, image data, character data and control data.

The threshold value may be preset at a value in a range from 5% to 20% of the number of bits subjected to the error correction.

According to the present invention, the error of the received digital data is detected by comparing the threshold value with the number of errors of the path metrics of the Viterbi decoding, which has a high correlation with the error rate of the path metric. This offers an advantage of implementing highly accurate, effective error detection.

In addition, detecting the error once again of the received digital data which has been decided as including only a small number of errors as a result of the foregoing comparison also has an advantage of achieving highly accurate, effective error detection.

BRIEF DESCRIPTION OF THE DRAWINGS

FIG. 3 is a flowchart illustrating the operation of the embodiment 1;

FIG. 4 is a block diagram showing an embodiment 2 of a receiver of a digital portable telephone with an error detecting device of received digital data in accordance with the present invention;

FIG. 6 is a table showing correlations between the number of errors of input data and the number of errors of path metrics;

FIG. 7 is a table showing correlations between error rates and the number of errors of output data;

DETAILED DESCRIPTION OF THE PREFERRED EMBODIMENTS

The invention will now be described with reference to the accompanying drawings.

EMBODIMENT 1

Figure 1:
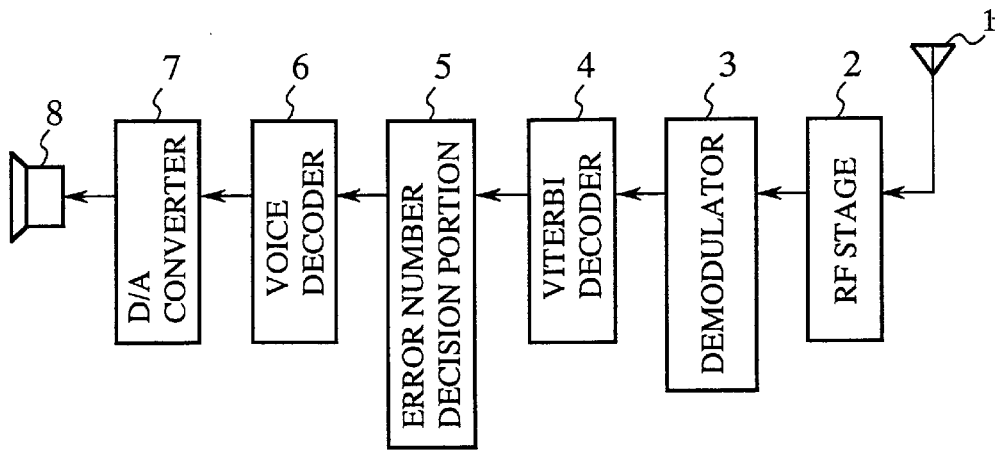
FIG. 1 is a block diagram showing an embodiment 1 of a receiver of a digital portable telephone with an error detecting device of received digital data in accordance with the present invention.

FIG. 1 is a block diagram showing an embodiment 1 of a receiver of a digital portable telephone with an error detecting device for received digital data in accordance with the present invention. In FIG. 1, the reference numeral 1 designates an antenna, 2 designates an RF (Radio Frequency) stage for accepting a received signal through the antenna 1, 3 designates a demodulator, 4 designates a Viterbi decoder, 5 designates an error number decision portion, 6 designates a voice decoder (decoder), 7 designates a D/A converter, and 8 designates a speaker, which are connected in this order.

Figure 2:
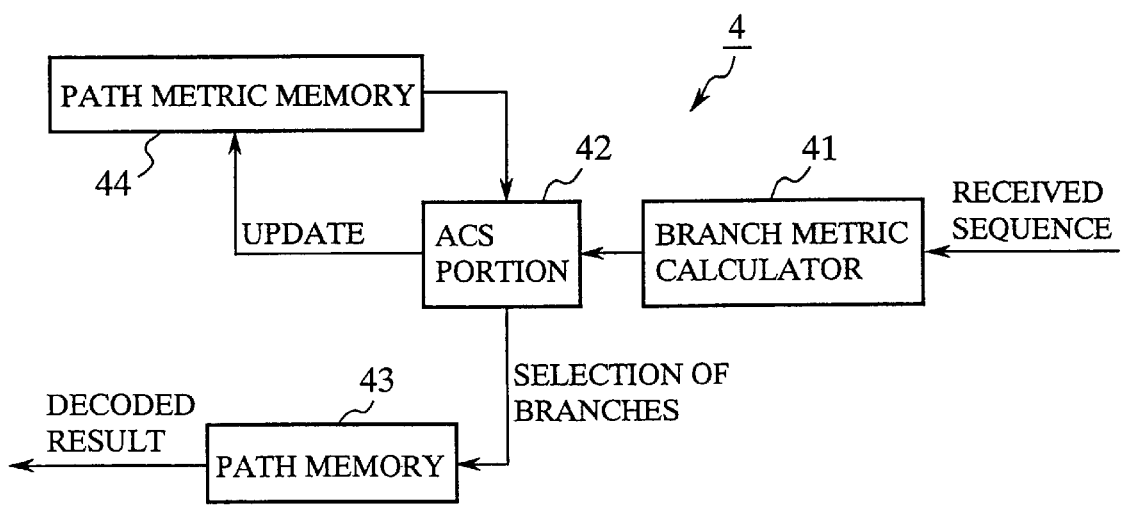
FIG. 2 is a block diagram showing the Viterbi decoder in FIG. 1.

FIG. 2 is a block diagram showing a configuration of the Viterbi decoder 4. The Viterbi decoder 4 comprises a branch metric calculator 41 for receiving received digital data and performing branch metric calculation; an ACS (add compare select) portion 42 for choosing survivor paths; a path memory 43 for storing the survivor paths of respective states or their corresponding information sequences; and a path metric memory 44 for storing their metrics.

The branch metric calculator 41 finds the distance of the m-th subsequence of the received sequence for all branches connecting m-th stage states to the (m+1)-th stage states of the trellis of the Viterbi algorithm. The ACS portion 42 adds these distances to the metrics of the m-th stage states to obtain the metric candidates for the (m+1)-th stage states, compares the metric candidates, and selects the minimum of the metric candidates for each state at the (m+1)-th stage as a survivor path. The path memory 43 stores the survivor paths or information sequences corresponding to these survivor paths. The path metric memory 44 stores the number of errors of each path metric, which is defined as the sum total of the distances of respective branches constituting the path metric. Details of the Viterbi algorithm are described, for example, in pp. 486–488 and 786–788 of "Communication Systems Engineering" by John G. Proakis and Masoud Salehi, Prentice-Hall, Inc. 1994, which is incorporated herein by reference.

Next, the operation of the present embodiment 1 will be described with reference to the flowchart of FIG. 3.

The received digital data obtained through the antenna 1, RF stage 2 and demodulator 3 is supplied to the branch metric calculator 41 of the Viterbi decoder 4, which performs the branch metric calculation. Subsequently, the ACS portion 42 carries out the addition and comparison as described above, and selects the survivor paths. The path memory 43 stores the survivor paths of the individual states, or the information sequences corresponding the survivor paths. The path metric memory 44 stores the number of errors of the path metrics. Thus, the Viterbi decoding is carried out at step ST3-1.

The inventors of the present invention experimentally found that the number of errors of the path metric has strict correlation with the number of errors of the input data. FIG. 6 shows an example of the correlations between these numbers, in which the "total number of bits" refers to the number of bits in each frame which are subjected to the error correction coding. As shown in FIG. 6, the number of errors of the path metric is almost equal to the number of errors of the input data. This supports the proposition that the error rate can be detected by means of the number of errors of the path metric obtained by the Viterbi decoding.

Afterward, the error number decision portion 5 compares the number of errors of the path metric stored in the path metric memory 44 with the predetermined threshold value at step ST3-2, and if the number of errors is greater than the threshold value, the voice decoder 6 carries out post-error-detection processing, like the mute processing, at step ST3-3.

On the other hand, if the number of errors of the path metric is less than the threshold value because of a small number of errors in the received digital data, the voice decoder 6 carries out the voice decoding at step ST3-4.

The threshold value is adjusted in accordance with the types of the received digital data such as image data, voice data sent from a portable telephone because the number of bits subjected to the error correction coding varies depending on the types of the received digital data. The threshold value is generally set at 5–20% of the number of bits subjected to the error correction coding.

FIG. 7 shows experimentally obtained relationships between the number of bits of the input data, the error rate of the input data, and the number of errors of the output data, where the error rate is defined as 100(the number of errors of the input data)/(the number of the bits). As shown in FIG. 7, the number of errors of the output data is zero as long as the error rate is below 10% because of the error correcting function. However, errors in the output data begin to occur in the range from 10% to 15%, and hence the optimum values of the threshold is found to be 10–15% from these experimental results.

Thus, the present embodiment 1 detects the error of the received digital data by comparing the threshold value with the number of errors of the path metric of the Viterbi decoding, which has close correlation with the error rate of the input data. This has an advantage of achieving accurate, effective error detection of the received digital data.

EMBODIMENT 2

FIG. 4 is a block diagram showing an embodiment 2 of the receiver of the digital portable telephone with the error detecting device for received digital data in accordance with the present invention, in which the portions corresponding to those of FIG. 1 are designated by same reference numerals and the description thereof is omitted here.

In FIG. 4, the reference numeral 9 designates a CRC decision portion connected between the error number decision portion 5 and voice decoder 6. The CRC decision portion 9 detects again the error of the received digital data, on which a decision has been made by the error number decision portion 5 that the number of errors is below the threshold value.

Figure 5:
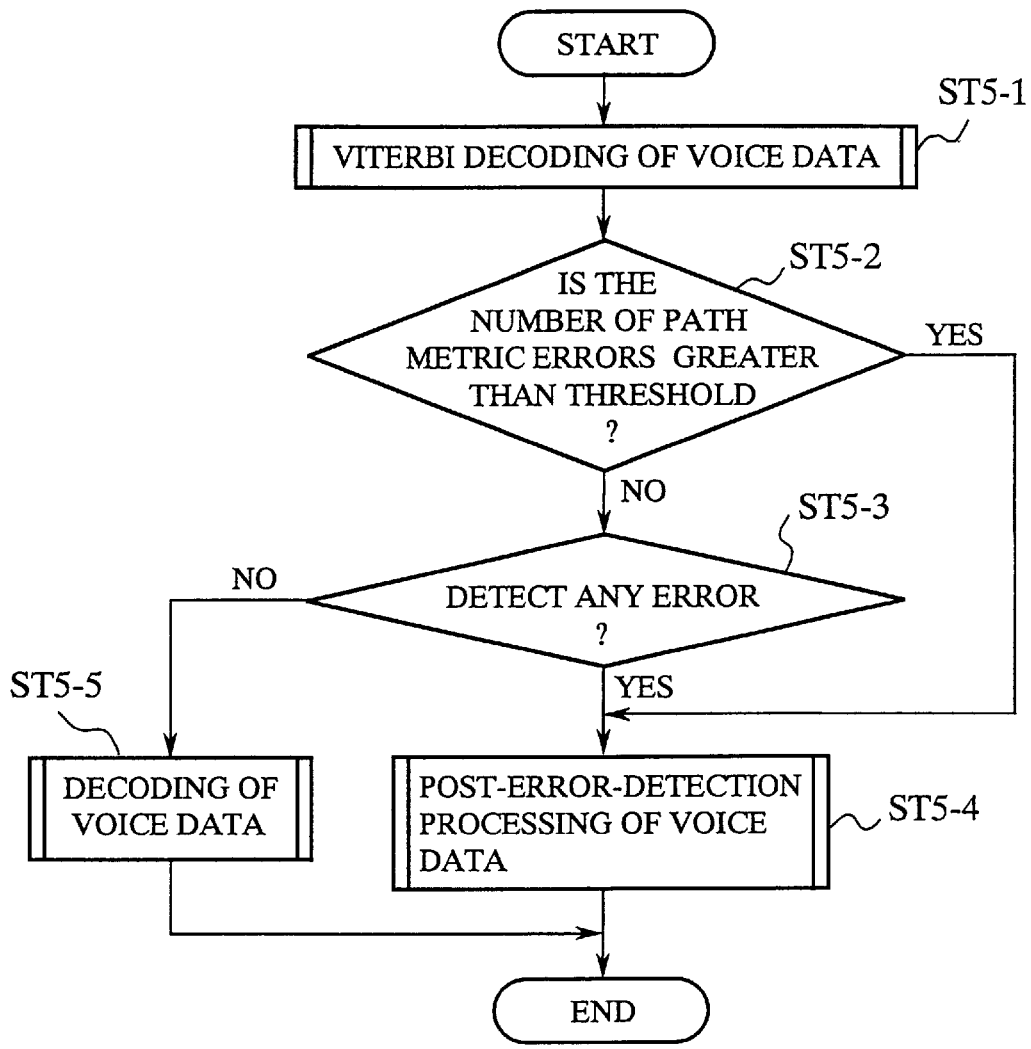
FIG. 5 is a flowchart illustrating the operation of the embodiment 2.
Figure 8:
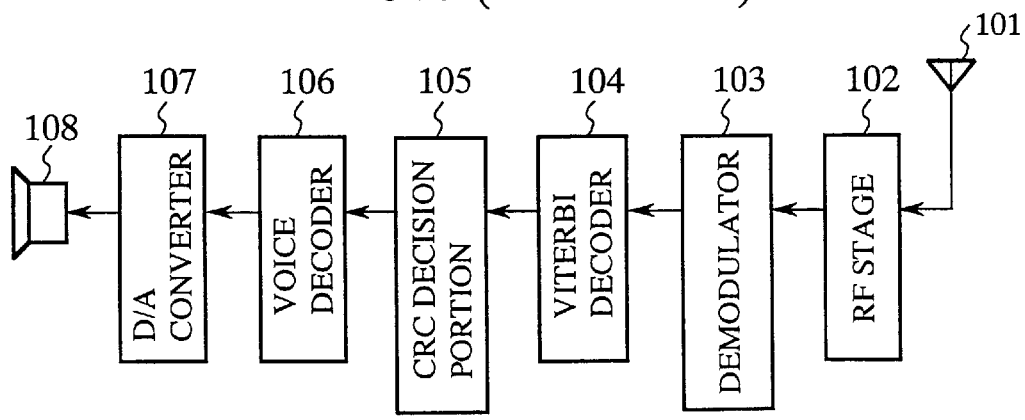
FIG. 8 is a block diagram showing a configuration of a receiver of a digital portable telephone with a conventional error detecting device of received digital data.
Figure 9:
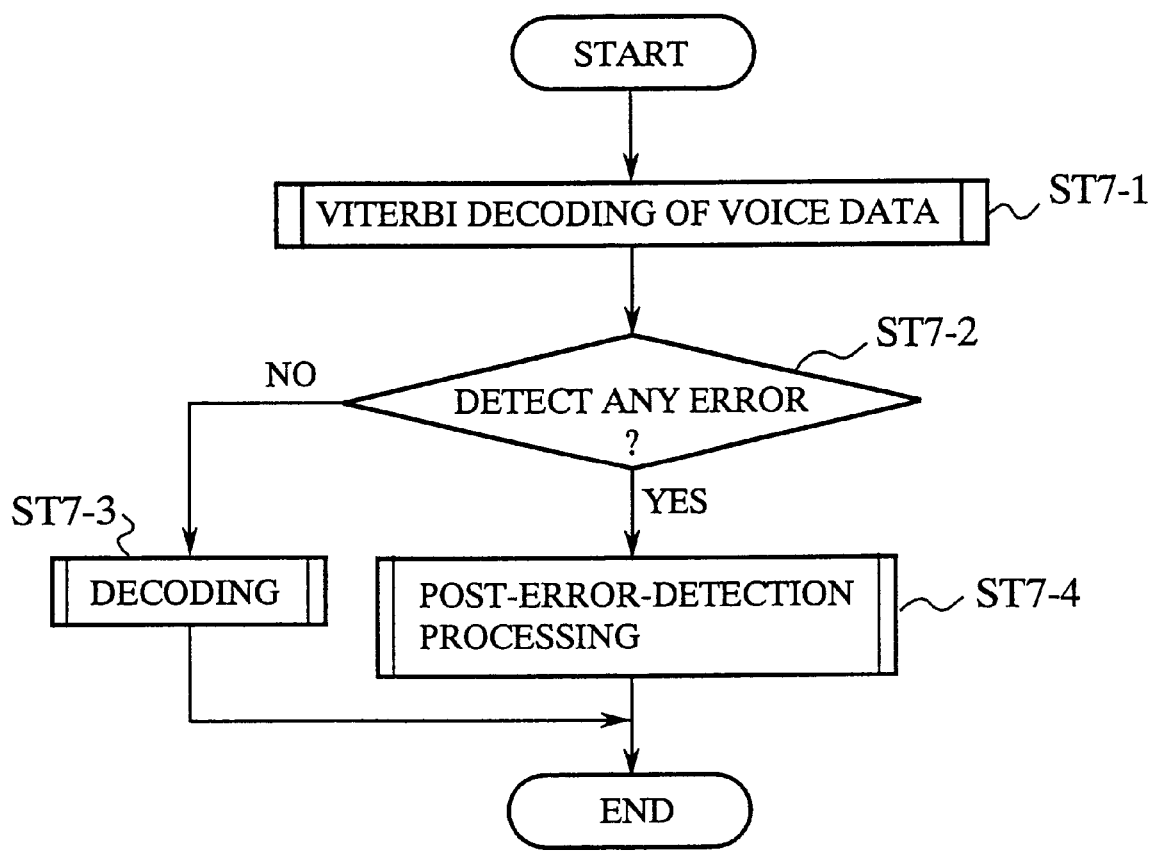
FIG. 9 is a flowchart illustrating the operation of the conventional system.

Next, the operation of the present embodiment 2 will be described with reference to the flowchart of FIG. 5.

The received digital data obtained through the antenna 1, RF stage 2 and demodulator 3 is subjected to the Viterbi decoding at step ST5-1. Then, the error number decision portion 5 compares the number of errors of the path metric with the predetermined threshold value at step ST5-2, and if it decides that the number of errors is greater than the threshold value, the voice decoder 6 carries out the post-error-detection processing like the mute processing at step ST5-4.

On the other hand, if the error number decision portion 5 makes a decision that the number of errors of the path metric is equal to or less than the threshold value, the CRC decision portion 9 detects the error of the received digital data at step ST5-3. If the CRC decision portion 9 detects any error, the voice decoder 6 carries out the post-error-detection processing at step ST5-4. In contrast, if the CRC decision portion 9 does not detect any errors, the voice decoder 6 carries out the voice decoding at step ST5-5.

Thus, the present embodiment 2 detects the error of the received digital data twice: First, the error number decision portion 5 detects it by comparing the threshold value with the number of errors of the path metric after the Viterbi decoding; and second, the CRC decision portion 9 detects it again using the CRC. This has an advantage of further improving the accuracy of the error detection and decoding.

EMBODIMENT 3

Although the foregoing embodiments 1 and 2 handle the received digital data of the voice in the digital portable telephone, the received digital data of any type can be handled in the same way as long as they are transmitted on the frame by frame basis. For example, the image data, character data or control data can be processed in the same manner, providing the same effect and advantage of the foregoing embodiments.

What is claimed is:

1. An error detecting device for detecting errors in received digital data comprising:

a Viterbi decoder for carrying out Viterbi decoding of the received digital data frame by frame, including a path metric memory that stores a number of errors of each path metric calculated by the Viterbi decoder;

an error number decision portion for comparing a number of errors of a path metric of the Viterbi decoding as stored in said path metric memory with a predetermined threshold value; and a decoder for decoding the received digital data for which the error number decision portion makes a decision that the number of errors of the path metric as stored in said path metric memory is equal to or less than the threshold value.

2. The error detecting device for received digital data as claimed in claim 1, wherein said received digital data is one of voice data, image data, character data and control data.

3. The error detecting device for received digital data as claimed in claim 1, wherein said threshold value is preset at a value associated with a number of bits subjected to error correction coding in each frame.

4. The error detecting device for received digital data as claimed in claim 1, wherein said received digital data consists of a combination of at least two types of data selected from voice data, image data, character data and control data.

5. The error detecting device for received digital data as claimed in claim 4, wherein said threshold value is preset at a value associated with a number of bits subjected to error correction coding in each frame.

6. The error detecting device for received digital data as claimed in claim 5, wherein said threshold value is preset at a value in a range from 5% to 20% of the number of bits subjected to the error correction coding.

7. An error detecting device for detecting errors in received digital data comprising:

a Viterbi decoder for carrying out Viterbi decoding of the received digital data frame by frame, including a path metric memory that stores a number of errors of each path metric calculated by the Viterbi decoder;

an error number decision portion for comparing a number of errors of a path metric of the Viterbi decoding as stored in said path metric memory with a predetermined threshold value;

an error detector for detecting an error of at least part of the received digital data, on which the error number decision portion makes a decision that the number of errors of the path metric as stored in said path metric memory is equal to or less than the threshold value; and a decoder for decoding the received digital data for which the error number detector makes a decision that a number of errors is equal to or less than the threshold value.

8. The error detecting device for received digital data as claimed in claim 7, wherein said received digital data is one of voice data, image data, character data and control data.

9. The error detecting device for received digital data as claimed in claim 7, wherein said error detector consists of a CRC (cyclic redundancy check) detector.

10. The error detecting device for received digital data as claimed in claim 7, wherein said threshold value is preset at a value associated with a number of bits subjected to error correction coding in each frame.

11. The error detecting device for received digital data as claimed in claim 7, wherein said received digital data consists of a combination of at least two types of data selected from voice data, image data, character data and control data.

12. The error detecting device for received digital data as claimed in claim 11, wherein said threshold value is preset at a value associated with a number of bits subjected to error correction coding in each frame.

13. The error detecting device for received digital data as claimed in claim 3, wherein said threshold value is preset at a value in a range from 5% to 20% of the number of bits subjected to the error correction coding.

14. The error detecting device for received digital data as claimed in claim 10, wherein said threshold value is preset at a value in a range from 5% to 20% of the number of bits subjected to the error correction coding.

15. The error detecting device for received digital data as claimed in claim 12, wherein said threshold value is preset at a value in a range from 5% to 20% of the number of bits subjected to the error correction coding.

* * * * *